United States Patent
Richards

(10) Patent No.: US 7,877,329 B2
(45) Date of Patent: Jan. 25, 2011

(54) APPARATUS AND METHOD FOR PROCESSING LICENSE KEYS USING DYNAMIC FIELD MAPPING

(75) Inventor: Ronald Wade Richards, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 1075 days.

(21) Appl. No.: 11/515,403

(22) Filed: Aug. 31, 2006

(65) Prior Publication Data

US 2007/0073627 A1  Mar. 29, 2007

Related U.S. Application Data

(60) Provisional application No. 60/720,070, filed on Sep. 23, 2005.

(51) Int. Cl.
*H04L 9/00* (2006.01)
*G06F 21/00* (2006.01)

(52) U.S. Cl. .............................. 705/57; 705/51; 713/172
(58) Field of Classification Search ................... 705/51, 705/57; 713/172
See application file for complete search history.

(56) References Cited

U.S. PATENT DOCUMENTS

| | | | |
|---|---|---|---|
| 5,499,295 A * | 3/1996 | Cooper | 380/270 |
| 5,745,879 A | 4/1998 | Wyman | |
| 5,978,476 A | 11/1999 | Redman et al. | |
| 6,526,512 B1 | 2/2003 | Siefert et al. | |
| 6,799,277 B2 * | 9/2004 | Colvin | 726/22 |
| 7,278,164 B2 * | 10/2007 | Raiz et al. | 726/26 |
| 2002/0164025 A1 * | 11/2002 | Raiz et al. | 380/231 |
| 2004/0125954 A1 * | 7/2004 | Riebe et al. | 380/231 |
| 2005/0044367 A1 * | 2/2005 | Gasparini et al. | 713/172 |
| 2005/0049976 A1 * | 3/2005 | Yang | 705/67 |
| 2005/0144139 A1 * | 6/2005 | Zhuge et al. | 705/59 |
| 2005/0210254 A1 | 9/2005 | Gabryjelski et al. | |
| 2005/0251488 A1 * | 11/2005 | Saunders et al. | 705/59 |
| 2006/0106728 A1 * | 5/2006 | Yellai et al. | 705/59 |
| 2007/0083936 A1 * | 4/2007 | Booth et al. | 726/27 |

* cited by examiner

*Primary Examiner*—Evens J Augustin
(74) *Attorney, Agent, or Firm*—Cooley LLP

(57) ABSTRACT

A method of processing licensing keys includes specifying a program defining a set of executable instructions where different subsets of executable instructions define different products. A set of licensing keys are constructed. Each licensing key has a fixed number of symbols, where each symbol includes multiple bits. At least one symbol is configured to be mapped to at least two fields and at least one field is configured to be mapped to at least two symbols. Each field specifies a feature of a product defined by a subset of executable instructions of the program. The program and a first license key are distributed to a first end user, while the program and a second license key are distributed to a second end user. The first license key is processed to define features of a first product. The second license key is processed to define features of a second product.

16 Claims, 4 Drawing Sheets

APPARATUS AND METHOD FOR PROCESSING LICENSE KEYS USING DYNAMIC FIELD MAPPING

CROSS REFERENCE TO RELATED APPLICATIONS

This application claims the benefit of U.S. Provisional Application Ser. No. 60/720,070, entitled "Apparatus and Method for Processing License Keys Using Dynamic Field Mapping," filed Sep. 23, 2005, the contents of which are hereby incorporated by reference in their entirety.

BRIEF DESCRIPTION OF THE INVENTION

This invention relates generally to licensing keys used to facilitate access to a product, such as a software product. More particularly, this invention relates to a technique for processing license keys using dynamic field mapping.

BACKGROUND OF THE INVENTION

License keys are used to facilitate access to a product, such as a software program. Typically, different products are compiled as separate programs and versions, and different license keys are assigned to the different programs and versions. This results in a proliferation of programs and versions, which is difficult to manage. In addition, this approach makes it difficult to patch various programs and versions, since a different patch is required for each program and each version. This prior art approach also causes problems when product features are altered. In particular, product feature alterations result in relatively large changes in the code base. Thus, product reinstallation and upgrade can be difficult.

It is known to use a license key with fixed field mapping. For example, a prior art license key uses twenty-three characters, where each character is mapped to a 5-bit number corresponding to each character. This direct mapping is used to indicate whether certain functionality is enabled within a product. This approach is effective in terms of enabling and disabling of functions. However, the license key size is not extensible and often the feature mappings that make sense for one product do not map well to another product. As a result, values are wasted and/or there are not enough values to cover the desired customization. It is possible to support additional features by enlarging the license key. However, this approach may become unwieldy and may create compatibility issues. For example, an enlarged license key may result in unused fields for some products.

In view of the foregoing, it would be desirable to provide an improved technique for generating and utilizing license keys.

SUMMARY OF THE INVENTION

The invention includes a method of processing licensing keys by specifying a program defining a set of executable instructions where different subsets of executable instructions define different products. A set of licensing keys are constructed. Each licensing key has a fixed number of symbols, where each symbol includes multiple bits. At least one symbol is configured to be mapped to at least two fields and at least one field is configured to be mapped to at least two symbols. Each field specifies a feature of a product defined by a subset of executable instructions of the program. The program and a first license key are distributed to a first end user, while the program and a second license key are distributed to a second end user. The first license key is processed to define features of a first product. The second license key is processed to define features of a second product.

The invention also includes a computer readable medium with executable instructions to specify a program defining a set of executable instructions where different subsets of executable instructions define different products. A key code with a fixed number of symbols is constructed. Each symbol includes multiple bits. At least one symbol is configured to be mapped to at least two fields, and at least one field maps to at least two symbols. Each field specifies a feature of a product defined by a subset of executable instructions of the program. The program and key code are distributed to an end user to allow the end user to access a product associated with the program, as specified by the key code.

The invention also includes a computer readable medium with executable instructions to receive a program defining a set of executable instructions where different subsets of executable instructions define different products. A key code associated with the product is identified. The key code includes a fixed number of symbols, where each symbol includes multiple bits. At least one symbol is mapped to at least two fields and one field is mapped to at least two symbols. Each field specifies a feature of a product defined by a subset of executable instructions of the program. The product specified by the key code is then accessed.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
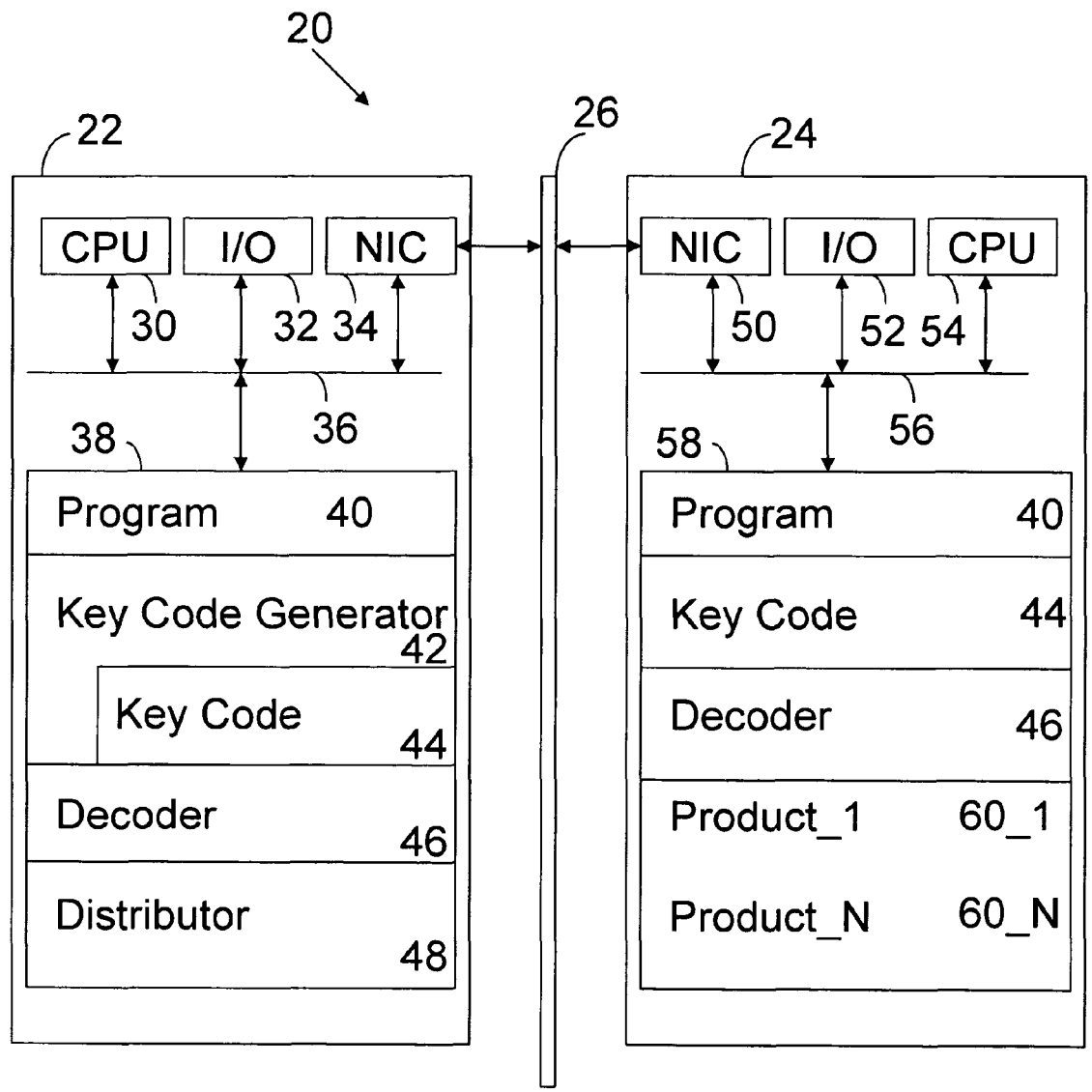
FIG. 1 illustrates a network configured in accordance with an embodiment of the invention.

FIG. 1 illustrates a network 20 configured in accordance with an embodiment of the invention. The network 20 includes a first computer 22 and a second computer 24 linked by a transmission medium 26, which may be any wired or wireless transmission medium. Computer 22 includes standard components, such as a central processing unit 30, input/output devices 32 and a network interface circuit 34, all linked by a bus 36. A memory 38 is also connected to the bus 36. The memory 38 stores a program 40. The program 40 includes a set of executable instructions. Different subsets of executable instructions define different products. In accordance with the invention, a single program 40 may be shipped for multiple products. As discussed below, a license key or key code is a set of symbols used to enable features of the program to establish a product. Each symbol may be a letter representing a multi-bit number. A key code may be configured to validate a product and/or specify which features in the product are to be enabled.

Memory 38 also stores a key code generator 42. The key code generator includes executable instructions to construct a key code or license key with specified attributes. Each key code has a fixed number of symbols or characters. Each symbol includes multiple bits. At least one symbol is configured to be mapped to at least two fields and at least one field maps to at least two symbols. A field is a set of bits that is ascribed a meaning, such as a product feature. Examples of key codes, symbols, and fields are provide below. The key code generator 42 generates key codes 44. As discussed below, a key code is shipped with a program to facilitate access to a product.

The memory 38 also stores a decoder 46. The decoder 46 includes executable instructions to process a key code. In particular, the decoder 46 includes executable instructions to locate a key code definition id in a key code. Based upon the key code definition id, fields are dynamically mapped. In addition, the key code definition id may be used to augment field information. That is, the decoder 46, upon establishing a product, may lookup resident product feature information that is not specified by the key code. Thus, the decoder 46 effectively includes additional information that does not have to form part of the key code. This allows a fixed key code size to be augmented with additional information resident in the decoder 46.

Memory 38 also includes a distributor 48. The distributor 48 includes executable instructions to route a program 40 and a key code 44. A decoder 46 is typically routed as well. Typically, the distributor 48 routes the program 40, key code 44 and decoder 46 electronically across a network to a target computer. Alternately, the distributor 48 generates instructions to coordinate traditional mail delivery of the program 40, key code 44 and decoder 46. Any number of alternate techniques may be used to accomplish the delivery of the program 40, key code 40 and/or decoder 46. For example, routing may be accomplished by a human (e.g., in a sales office). Routing may also be through a third party (e.g., a sales partner company). Routing may also be through retail channels.

The second computer 24 also includes standard components, such as a network interface circuit 50, input/output devices 52 and a central processing unit 54, all linked by a bus 56. A memory 58 is also connected to the bus 56. The memory 58 stores program 40, key code 44 and decoder 46. If the program 40 was routed electronically from the first computer 22, the program 40 is automatically stored in memory 58. Alternately, if the program 40 was sent to the user of the second computer 24 via traditional mail, then the user loads the program into memory 58, such as by downloading the program from a computer readable medium, such as a compact disk. The key code 44 and decoder 46 are received by the second computer 24 in a similar manner.

The decoder 46 reads the key code 44 associated with the program 40. The decoder 46 then enables subsets of executable instructions of the program 40 to produce a product, such as a first product 60_1. Different key codes may be processed by the decoder 46 to produce different products from the same program 40.

Figure 2:
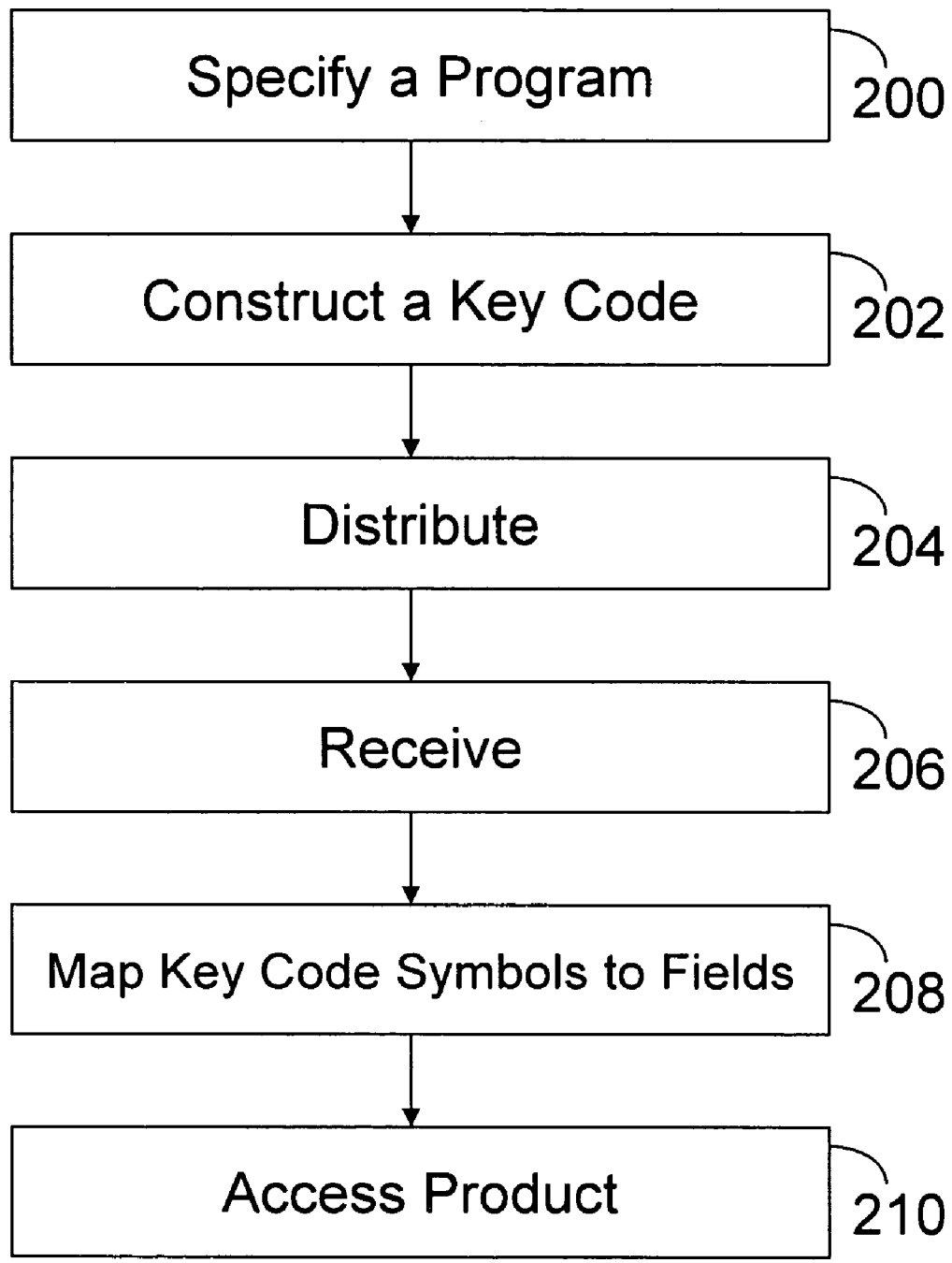
FIG. 2 illustrates processing operations associated with an embodiment of the invention.

FIG. 2 illustrates processing operations associated with an embodiment of the invention. Initially, a program is specified 200. The program 40 may be created, downloaded, or linked in this process. The program 40 is a single executable program. Different subsets of instructions within the single executable program define different products. The key code is used to specify a product associated with the program 40.

The next processing operation of FIG. 2 is to construct a key code 202. The key code generator 42 may be used to implement this operation. The program and associated key code are then distributed 204. The distributor 48 may be used to coordinate this operation, either electronically or through traditional mail. The decoder 46 is also typically distributed in this process, although a target computer may already have the requisite decoder.

Processing operations 200-204 are associated with an originating computer (e.g., the first computer 22). The next processing operations are associated with a target computer (e.g., the second computer 24). The target computer receives the program and key code 206. Key code symbols are then mapped to fields 208. The decoder 46 may implement this operation. In addition to this dynamic field mapping, the decoder 46 may implement static field mapping. For example, for a given identified product, the decoder 46 may recognize fixed fields associated with the product. Further, the decoder 46 may lookup additional information associated with a fixed field. This effectively serves to supplement the information in the key code. The fields are then associated with subsets of instructions within the program, which are enabled to access a product 210.

Figure 3:
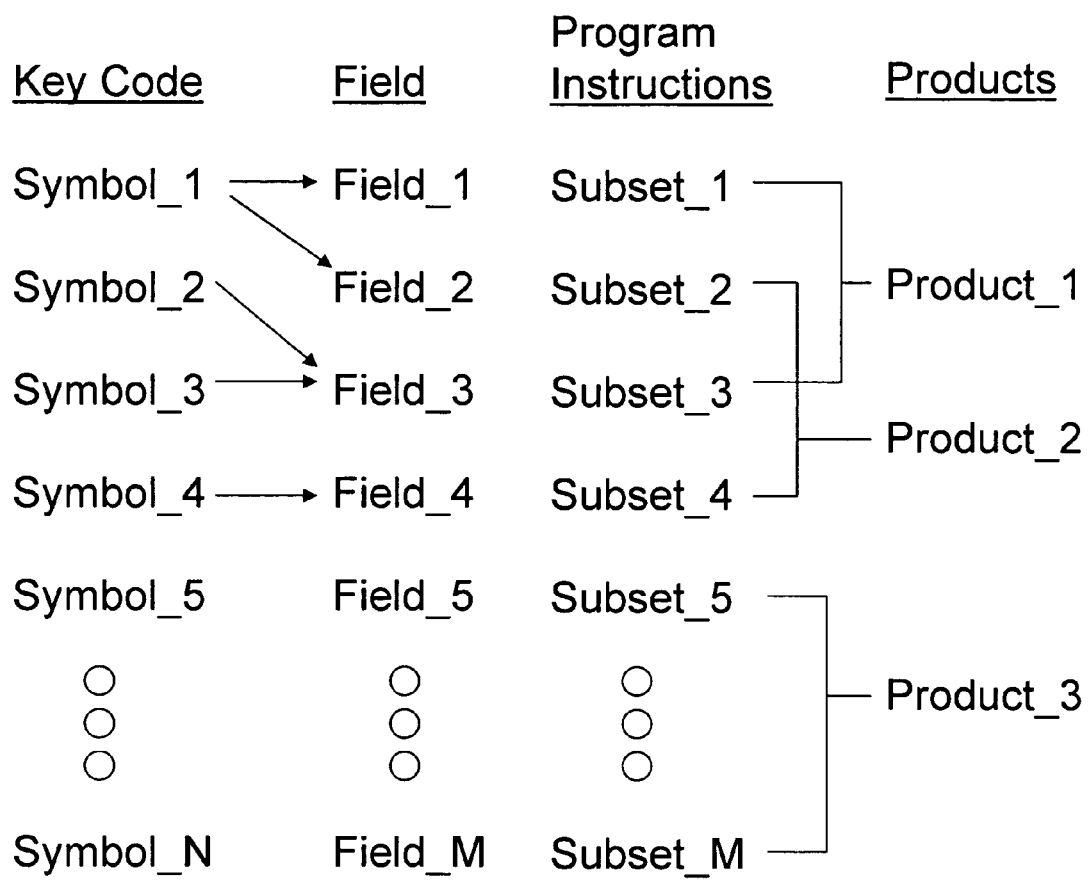
FIG. 3 illustrates the mapping of key codes to fields and corresponding subsets of program instructions that are used to produce a variety of products.

FIG. 3 illustrates the construction of various products from various subsets of program instructions. Each subset of program instructions is associated with a field. Key code symbols are used to map to the fields. For example, FIG. 3 shows that Symbol_1 maps to Field_1 and Field_2. Thus, here, a symbol maps to multiple fields.

Symbol_2 maps to Field_3. In addition, Symbol_3 maps to Field_3. Thus, in this example, two symbols map to a single field. Symbol_4 maps to Field_4. In this case, there is a direct mapping between a symbol and a field.

FIG. 3 illustrates that Product_1 is formed by combining Subset_1 and Subset_3 of the program instructions. Product_2 is formed by combining Subset_2 and Subset_4 of the program instructions. Product_3 is formed by combining Subset_5 through Subset_M of the program instructions.

Thus, this figure illustrates how multiple products may be derived from a single executable program or set of program instructions. The figure also illustrates that subsets of program instructions are associated with fields. Symbols map to the fields (and vice versa), thereby allowing a key code to specify a subset of program instructions that are used to create a product.

Figure 4:
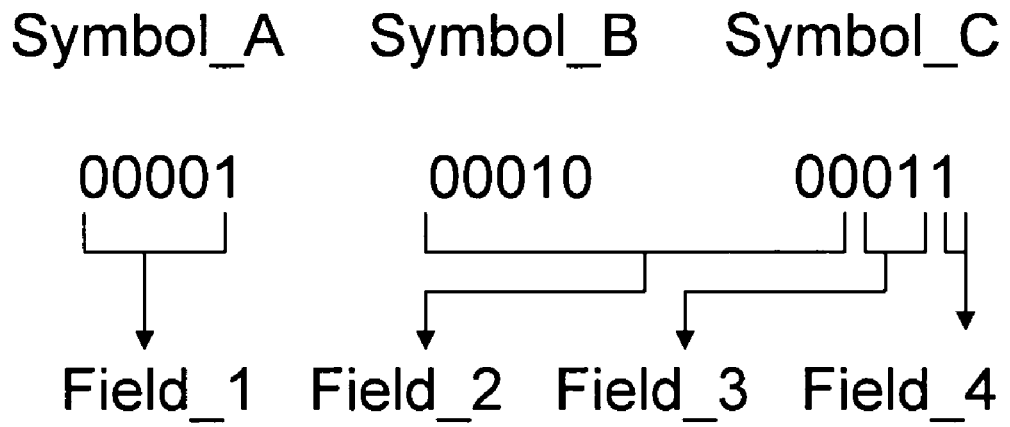
FIGS. 4-5 illustrates dynamic field mapping performed in accordance with an embodiment of the invention.

FIG. 4 illustrates a set of symbols that form a simple key code. In this example, each symbol has a corresponding set of five bits. The bits are mapped to fields, which may have an arbitrary size. In this example the bits 00001 associated with Symbol_A are mapped to a single field (Field_1). Field_2 has 7 bits associated with it—the five bits (00010) associated with Symbol_B and two bits (00) associated with Symbol_C. This provides another example of multiple symbols mapping to a single field. Field_3 is associated with two bits (01) of Symbol_C. Finally, Field_4 is associated with a single bit (1) of Symbol_C. Field_3 and Field_4 illustrate how multiple fields can map to a single symbol (Symbol_C).

Figure 5:
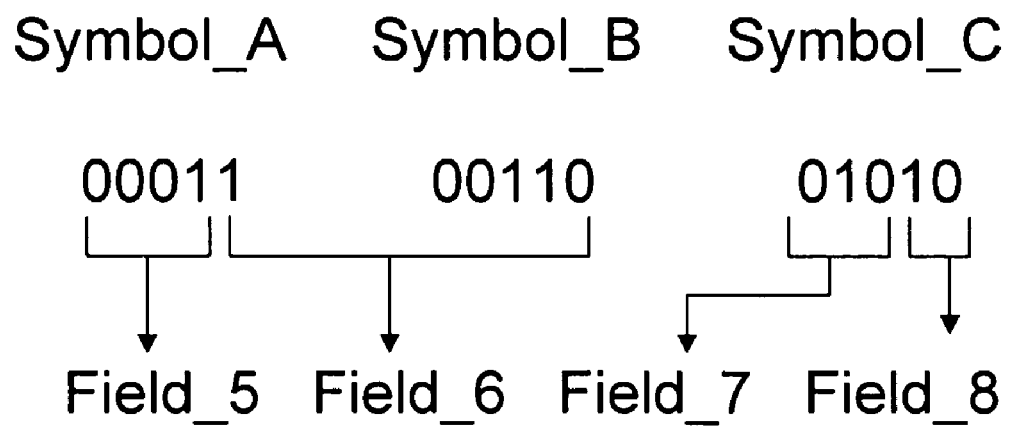

FIG. 5 illustrates a dynamic remapping of fields. In FIG. 5, Symbol_A, Symbol_B, and Symbol_C are associated with a different product code than the product code of FIG. 4. The different product code results in the same symbols being mapped to different fields. Four bits associated with Symbol_A map to Field_5. Recall that in FIG. 4, all five bits associated with Symbol_A mapped to Field_1. In FIG. 5, Field_6 includes bits associated with both Symbol_A and Symbol_B. In FIG. 4, Field_2 is populated with bits from Symbol_B and Symbol_C. Symbol_C of FIG. 5 is used to populate Field_7 and Field_8.

The invention enhances the model of a centralized license key engine (i.e., key code generator 42) by re-organizing how the key is used to make more effective use of the entire length of the key code. In one embodiment, this is done by establishing a field called the "key code definition id". In one embodiment, the key code definition id field is 15 bits long. The key code definition id operates to define the meaning of the other bits in the key code. Product, level and version (PLV) information may be combined into a fixed field for a particular key code definition. This allows one to have multiple different key code definitions with the same PLV. For example, a PLV value of 100 may refer to "Business Objects Enterprise, Professional, version 11". Two different key code definitions may then be associated with a PLV value of 100.

Fixed fields are stored in the decoder 46, not key code or license key. In one embodiment, fixed fields depend on the key code definition id. Clients of the key code do not know if a field is fixed or not. The decoder 46 returns a fixed value or a value from a key code string. This centralizes the evaluation of key codes to a centralized engine. Thus, information is not distributed throughout the code. Therefore, the code is easier to maintain.

In one embodiment, each symbol represents a 5-bit number (i.e., a value between 0 and 31). Using a twenty-three symbol key code results in a 115 bit string. The bits are divided into fields, with each field having a different meaning. Some fields represent features, while other fields may be used for housekeeping (e.g., a checksum). A field may control a feature of the product. A field may also control how the key code.dll interprets the key code (e.g., expiration date and timeout). Significantly, there is no direct mapping between letters and fields. One field may cross several symbols; one symbol may affect several fields, as shown in FIGS. 3-5.

Fields can include: a generator version field, a product field, a product version field, an encryption field, a level field, a language field, an ESD field, a user license type field, a dimensions field, and a license count field.

In one embodiment, there is a 15-bit key code definition ID field. The meaning of the bits depends upon the key code definition. This allows optimal use of the bits in the key code. For example, for one key code definition bits 26 through 30 are the maximum CPU count, while for another key code definition, bits 20 through 36 are the user license count. In both example definitions, the product, version and level fields are fixed, and therefore do not use any additional bits in the key code.

When generating a key code, a user may select a key code corresponding to a product. The selection of a key code definition results in the specification of a fixed set of attributes associated with the product. A user may also specify various values, such as a customer identification, an OEM identification, a language, an allowed number of users, and an expiration date. This fixed and variable information is then mapped into a license key or key code.

The decoder 46 can be configured to contain certain types of static information. Fixed fields depend on the key code definition id. Clients of the keycode.dll do not know if a field is fixed or not. The decoder 46 returns a fixed value or value from a key code string. The invention allows the key code to be queried to determine what product features should be enabled. This allows one binary program to represent multiple products. Therefore, the single binary program is easier to distribute, patch and otherwise alter. The invention allows one to combine key codes. For example, one key code can specify 10 user licenses, while another specifies 5 user licenses. Combining the key codes results in 15 licenses. Thus, it is possible to sell key codes as a commodity through VAR and OEM channels.

The key code generator 42 may generate key codes that combine the attributes of multiple distinct products within a single key code by aggregating the features of the multiple products. Given that the allocation of bits within the key code changes depending on the product, this aggregation is not based on a 1:1 correspondence. Because the key code is feature based, it is possible to combine products and features within products to create new "hybrid" products based on enabling functionality, such as an "all features of all products enabled" key code for use by sales people to demonstrate the full product line functionality or other custom mixed feature sets that are perceived as new products.

Similarly, the key code decoder can interpret a collection of key codes to determine the feature to enable based on a logical union between multiple sets of product features. The aggregation can be used to upgrade within an existing product or to combine the features of multiple products. When decoding a collection of key codes, the decoder interprets the bit allocation for features based on the product identified in the key code and performs aggregation. Fields are interpreted based on the feature that they define and the aggregation behavior of features can be defined to return the sum, union, max or min value for the feature. For example, a feature for concurrent licenses for a product would behave as a sum so that additional concurrent license key codes could simply be added to a collection, but a throttle value set as a percentage throughput would use the maximum throughput value when multiple values for the throughput feature were combined. Some fields in a key code, such as a serial number, cannot be aggregated. Preferably, the key code decoder does not enable one to query such fields.

The invention allows a single binary program to support multiple products. Thus, multiple products are easy to distribute and patch. In addition, the invention makes it easy to change features in a product.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
specify a program defining a set of executable instructions wherein different subsets of executable instructions define different products;
construct a key code with a fixed number of symbols, each symbol includes multiple bits and at least one symbol is mapped to at least two fields, and at least one field maps to at least two symbols in a map operation, each field specifies a feature of a product defined by a subset of executable instructions of the program; and
distribute the program and key code to an end user to allow the end user to access a product associated with the program, as specified by the key code and the map operation.

2. The computer readable storage medium of claim 1 further comprising executable instructions to define a decoder to process the key code.

3. A computer readable storage medium, comprising executable instructions to:
receive a program defining a set of executable instructions wherein different subsets of executable instructions define different products;
identify a key code associated with a product, wherein the key code includes a fixed number of symbols, wherein each symbol includes multiple bits;
map at least one symbol to at least two fields and one field to at least two symbols in a map operation, wherein each field specifies a feature of a product defined by a subset of executable instructions of the program; and
access, by the map operation, the product specified by the key code.

4. The computer readable storage medium of claim 3 further comprising executable instructions to produce a key code identification from the key code.

5. The computer readable storage medium of claim 4 further comprising executable instructions to dynamically configure fields in accordance with the key code identification.

6. The computer readable storage medium of claim 4 further comprising executable instructions to look up field values corresponding to the key code identification.

7. The computer readable storage medium of claim 6 wherein the executable instructions to look up field values include executable instructions to look up field values resident in a decoder.

8. A method of processing a licensing key, comprising:
specifying, at a server computer, a program defining a set of executable instructions wherein different subsets of executable instructions define different products;
constructing, at the server computer, a set of licensing keys, wherein each licensing key has a fixed number of symbols, each symbol includes multiple bits and at least one symbol is mapped to at least two fields and at least one field is mapped to at least two symbols in a mapping operation, wherein each field specifies a feature of a product defined by a subset of executable instructions of the program; and
distributing the program and a first license key to a first end user at a first computer and distributing the program and a second license key to a second end user at a second computer;
processing the first license key using the mapping operation to define features of a first product at the first computer; and
processing the second license key using the mapping operation to define features of a second product at the second computer.

9. The method of claim 8 further comprising accessing the first product and the second product.

10. The method of claim 8 further comprising producing a first key code identification from the first license key and a second key code identification from the second license key.

11. The method of claim 10 further comprising dynamically configuring a first set of fields in response to the first key code identification and a second set of fields in response to the second key code identification.

12. The method of claim 10 further comprising looking up a first set of field values associated with the first key code identification and a second set of field values associated with the second key code identification.

13. The method of claim 10 further comprising dynamically configuring variable fields.

14. The method of claim 10 further comprising dynamically configuring fixed fields.

15. The method of claim 10 further comprising performing a logical function between a first field of the first license key and a second field of the second license key to establish an enabled product feature.

16. The method of claim 10 further comprising aggregating features of the first license key and the second license key.

* * * * *